United States Patent
Sumption

(10) Patent No.: US 10,122,796 B2
(45) Date of Patent: Nov. 6, 2018

(54) SYSTEM FOR MONITORING TEMPERATURE AND OTHER CONDITIONS IN WATER BODIES

(71) Applicant: Grayden Outdoor LLC, Brainerd, MN (US)

(72) Inventor: Trevor J. Sumption, Brainerd, MN (US)

(73) Assignee: GRAYDEN OUTDOOR, LLC, Brainerd, MN (US)

( * ) Notice: Subject to any disclaimer, the term of this patent is extended or adjusted under 35 U.S.C. 154(b) by 242 days.

(21) Appl. No.: 14/792,088

(22) Filed: Jul. 6, 2015

(65) Prior Publication Data

US 2017/0012713 A1    Jan. 12, 2017

(51) Int. Cl.
*H04B 11/00*        (2006.01)
*H04L 29/08*        (2006.01)
*A01K 97/00*        (2006.01)

(52) U.S. Cl.
CPC .............. *H04L 67/12* (2013.01); *A01K 97/00* (2013.01); *Y02A 40/86* (2018.01)

(58) Field of Classification Search
CPC ......... H04B 11/00; H04L 67/12; A01K 97/00; Y02A 40/86
See application file for complete search history.

(56) References Cited

U.S. PATENT DOCUMENTS

| | | | | |
|---|---|---|---|---|
| 5,687,137 A | * | 11/1997 | Schmidt | H04B 11/00 367/131 |
| 8,875,570 B2 | * | 11/2014 | Sumption | G01F 23/18 73/292 |
| 2009/0293336 A1 | * | 12/2009 | Lankinen | A01K 91/08 43/4 |
| 2009/0299501 A1 | * | 12/2009 | Lankinen | A01K 91/08 700/56 |
| 2011/0258901 A1 | * | 10/2011 | Garrett | A01K 91/08 43/4.5 |
| 2012/0011930 A1 | * | 1/2012 | Sumption | G01F 23/18 73/292 |
| 2014/0071167 A1 | * | 3/2014 | Lauenstein | G06T 17/05 345/634 |
| 2015/0085602 A1 | * | 3/2015 | Lebedev | G01S 7/003 367/3 |
| 2017/0012713 A1 | * | 1/2017 | Sumption | H04B 11/00 |

* cited by examiner

*Primary Examiner* — Daniel Pihulic
(74) *Attorney, Agent, or Firm* — Cardle Patent Law Chtd

(57) ABSTRACT

A monitoring system is disclosed herein. In various aspects, the monitoring system may include a sensor mounted upon a submersible probe to detect sensor data at a depth within a water body, and a mobile device in communication with the sensor to receive the sensor data. The mobile device may be in communication with the Internet cloud to communicate data with the Internet cloud, the data comprising the sensor data and additional sensor data from additional probes geographically disposed about the water body at known GPS locations. An app may be operably engaged with the mobile device and with the Internet cloud to control the communication of data between the mobile device and the Internet cloud, and the app may integrates the data for on the mobile device in real time. This Abstract is presented to meet requirements of 37 C.F.R. § 1.72(b) only. This Abstract is not intended to identify key elements of the apparatus and methods disclosed herein or to delineate the scope thereof.

16 Claims, 3 Drawing Sheets

SYSTEM FOR MONITORING TEMPERATURE AND OTHER CONDITIONS IN WATER BODIES

BACKGROUND OF THE INVENTION

Field

The present disclosure relates to systems for the monitoring of temperature and other conditions in water bodies.

Background

A natural body of water may have a temperature structure due to variations in the water temperature between the surface and the bottom. In a lake, for example, the temperature structure may be divided into three zones, the epilimnion, the thermocline, and the hypolimnion. The epilimnion, which is the zone of water generally proximate the water surface, generally has a warmer water temperature than the other zones. The water temperature may be generally evenly distributed throughout the epilimnion, as the water in the epilimnion may be generally well mixed by turbulence resulting from wind and wave action. The zone adjacent the bottom is the hypolimnion. Water in the hypolimnion is colder than water in the epilimnion. A transition zone known as the thermocline separates the epilimnion from the hypolimnion. The water temperature in the thermocline is characterized by a water temperature gradient as the water temperature in the thermocline varies from the warm water temperature of the epilimnion to the cool water temperature of the hypolimnion. Fish may gather about the thermocline or proximate the boundary between the epilimnion and the thermocline.

The temperature structure of the water body may be obtained by measuring the water temperature at various depths between the water surface and the bottom to determine the temperature profile. The depth of the epilimnion, thermocline, and hypolimnion, for example, may be obtained from the water temperature profile.

A water body such as a lake or reservoir may have other water temperature structures depending upon the time of the year and the climate of the region. Rivers may have various temperature structures, and estuaries or the ocean may have various thermal strata, water temperature currents, and other temperature structures. In addition, there may be various currents within the water body, for example, due to inflows, outflows, or tides.

Various species of fish may live in a preferred water temperature range, which may be quite limited. Some species of fish travel along the thermocline or break or will prefer other zones or water temperature structures. Accordingly, in order to fish effectively for a certain species of fish, it may be important to locate the thermocline or other strata having the water temperature the that species prefers. Furthermore, various species of fish may prefer a current or lack of current (stagnant). Certain fish may prefer certain water clarity conditions. Other hydrologic, celestial, or meteorological conditions may be important to the fisherman.

Accordingly, there is a need for improved system for monitoring temperature and other conditions in water bodies, as well as related methods and compositions of matter.

BRIEF SUMMARY OF THE INVENTION

These and other needs and disadvantages may be overcome by the apparatus and related methods and compositions of matter disclosed herein. Additional improvements and advantages may be recognized by those of ordinary skill in the art upon study of the present disclosure.

A monitoring system is disclosed herein. In various aspects, the monitoring system may include a sensor mounted upon a submersible probe to detect sensor data at a depth within a water body, and a mobile device in communication with the sensor to receive the sensor data. The mobile device may be in communication with the Internet cloud to communicate data with the Internet cloud, the data comprising the sensor data and additional sensor data from additional probes geographically disposed about the water body at known GPS locations. An app may be operably engaged with the mobile device and with the Internet cloud to control the communication of data between the mobile device and the Internet cloud, and the app may integrates the data for on the mobile device in real time.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1A:
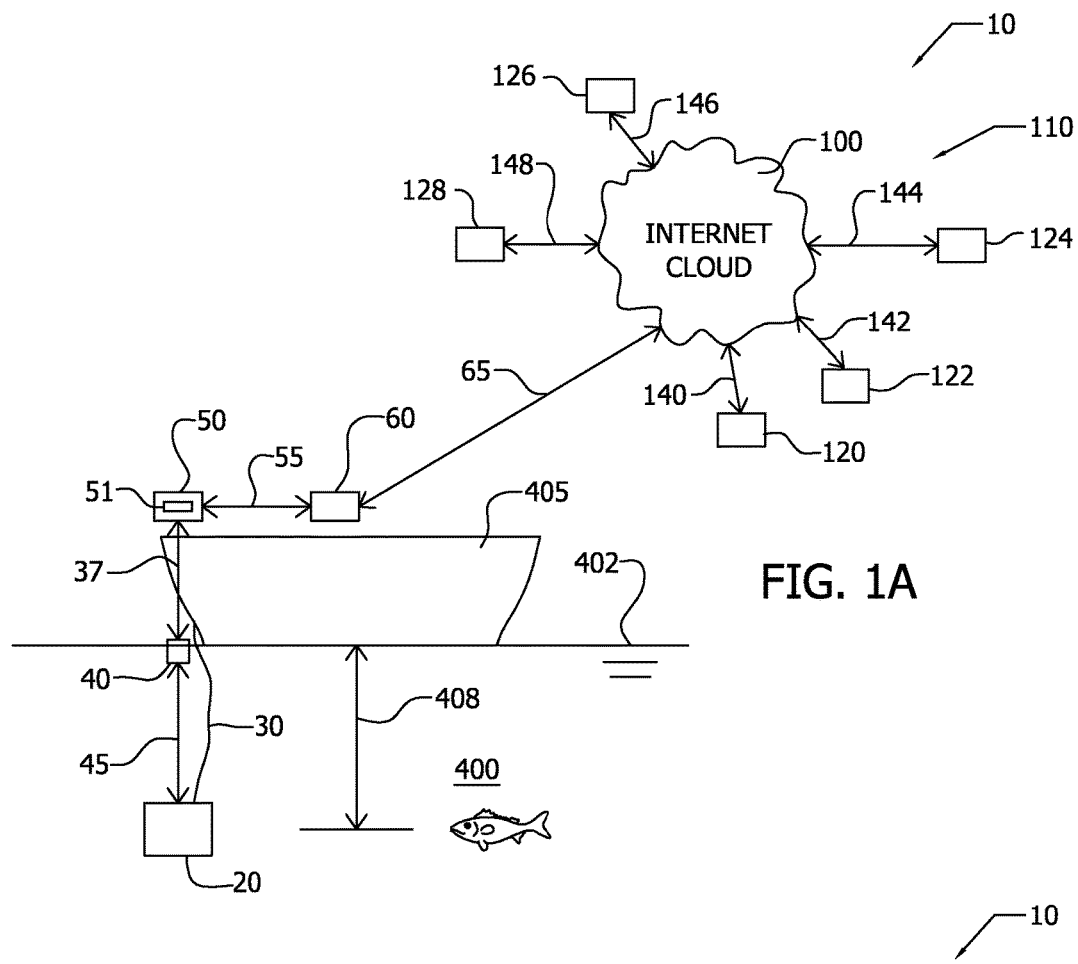
FIG. 1A illustrates an exemplary implementation of a monitoring system by a side view in combination with a schematic diagram.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

Apparatus, methods, and compositions of matter disclosed herein are directed toward a monitoring system for monitoring conditions of a water body in real time. In various aspects, the apparatus comprises a number of submersible sensors towed about a water body to collect data comprising depth and corresponding temperature at known GPS locations over a period of time. The sensors may be secured to fishing boats and may be employed by users during the course of fishing to detect thermal or other structures in the water body conducive to fish. The data may further include a log of fish catch data at the known GPS locations that may be input by the user(s). The sensors, in various aspects, are in communication with the Internet cloud through mobile devices. An app is in operable communication with the Internet cloud and with the mobile devices to display the data collected by the number of sensors on the mobile devices, in various aspects. The data may be shared between the mobile devices through the Internet cloud under the control of the app as determined by the user, in various aspects.

The apparatus and related methods and compositions of matter disclosed herein may be implemented, at least in part, in software having the form of computer readable instructions adapted to execute upon one or more computers to cause the one or more computers to function as the apparatus or to implement the steps of the methods. The methods disclosed herein may be implemented as a combination of hardware and software, in various aspects. Compositions of matter disclosed herein include non-transient computer readable media operably received by a computer to cause the computer to cause the one or more computers to function as the apparatus or to implement the steps of the methods. As used herein, the term system may refer to a computer-related entity, either hardware, a combination of hardware and software, software, or software in execution.

Mobile device, as used herein, includes smartphones, computers, tablets, and other microprocessor enabled communication devices and computers. Internet cloud may include networks including cellular networks as well as other networks of local to global scope. Internet cloud may include, for example, data storage devices, input/output devices, routers, databases, computers including servers, mobile devices, wireless communication devices, cellular networks, optical devices, cables, and other hardware and operable software, as would be readily recognized by those of ordinary skill in the art upon study of this disclosure. App, as used herein, refers to software operably received, at least in part, by a mobile device, and the app may implement at least portions of the apparatus and related methods disclosed herein. The app may be operably received by at least portions of the Internet cloud including additional mobile devices, in various aspects.

Figure 2:
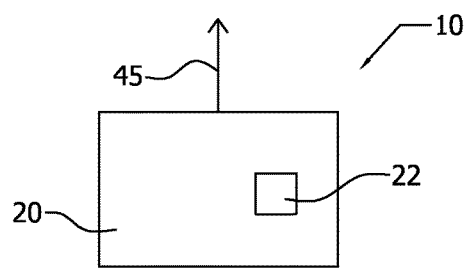
FIG. 2 illustrates by schematic diagram portions of the exemplary monitoring system of FIG. 1A.

FIG. 1A illustrates an implementation of monitoring system 10. As illustrated in FIG. 1A, monitoring system 10 includes probe 20 connected to boat 405 by cable 30. Probe 20 is immersed in water body 400 that may, for example, be a lake, reservoir, river, estuary, or the ocean. Probe 20 includes sensor 22 that generates sensor data 23 (see FIGS. 2 & 3). The sensor data 23 may be indicative, for example, of water temperature, depth, such as depth 408, or water velocity with respect to the probe 20 as detected by sensor 22. The sensor data 23, for example, may be a voltage or other analogue measurement, an 8 bit digital value, or a 16 bit digital value. Probe 20 may collect sensor data 23 as a single measurement by sensor 22, as a periodic burst of measurements by probe 22, or as continuous measurements by sensor 22.

As illustrated in FIG. 1A, receiver 40 is attached to boat 405 and extends into water body 400 generally proximate surface 402 of water body 400, so that probe 20 may communicate sensor data to receiver 40 via sound waves 45. Probe 20, which is at depth 408 in the illustration, generates sound waves 45 that are detected by receiver 40 to communicate sensor data 23 generated at depth 408 from sensor 22 of probe 20 to receiver 40. The sound waves 45 generated by probe 20, in some implementations, have a frequency of about 70 kHz.

Receiver 40 communicates with transponder 50 via communication pathway 37 to communicate the data received from probe 20 to transponder 50, as illustrated in FIG. 1A. Communication pathway may be either wired or wireless, in various implementations. Wired communication may be either electrical or optical.

Transponder 50 may processes sensor data 23 transmitted by probe 20, for example, to convert the sensor data 23 into data 43 (see FIG. 3) having selected units (e.g. British or SI) and at selected depths, times, and other such attributes. Transponder 50 may smooth data 23 during processing of data 23 into data 43, and transponder 50 may, for example, remove outliers or eliminate noise from data 23 during processing of data 23 into data 43.

Transponder 50 may display the data 43 on display 51. Probe 20 may include a microprocessor, memory, power source, sound generator to generate sound waves 45, and receiver 40, transponder 50, or both receiver 40 and transponder 50 may include a microprocessor, memory, analogue to digital convertor, power source, and so forth, as would be readily understood by those of ordinary skill in the art upon study of this disclosure. Transponder 50 may further include global positioning system (GPS) hardware and associated operable software to determine the GPS location 61 (see FIG. 1B) of the transponder 50 and to display the GPS location 61 on display 51. In other implementations, probe 20 may include a microprocessor to, at least in part, convert the sensor data 23 into data 43. In still other implementations, receiver 40 may include a microprocessor to, at least in part, convert the sensor data 23 into data 43.

As illustrated in FIG. 1A, monitoring system 10 includes mobile device 60 and mobile devices 120, 122, 124, 126, 128. Transponder 50, as illustrated in FIG. 1A, communicates with mobile device 60 by wireless channel 55 to display the data 43 on display 165 of mobile device 60 using app 110. (see FIG. 1B). Wireless channel 55 may conform, for example, to either the Bluetooth or Wi-Fi (IEEE 802.11) standards. Transponder 50 includes the hardware and software operably received by the hardware of transponder 50 to support communication between transponder 50 and mobile device 60 by wireless channel 55.

Figure 3:
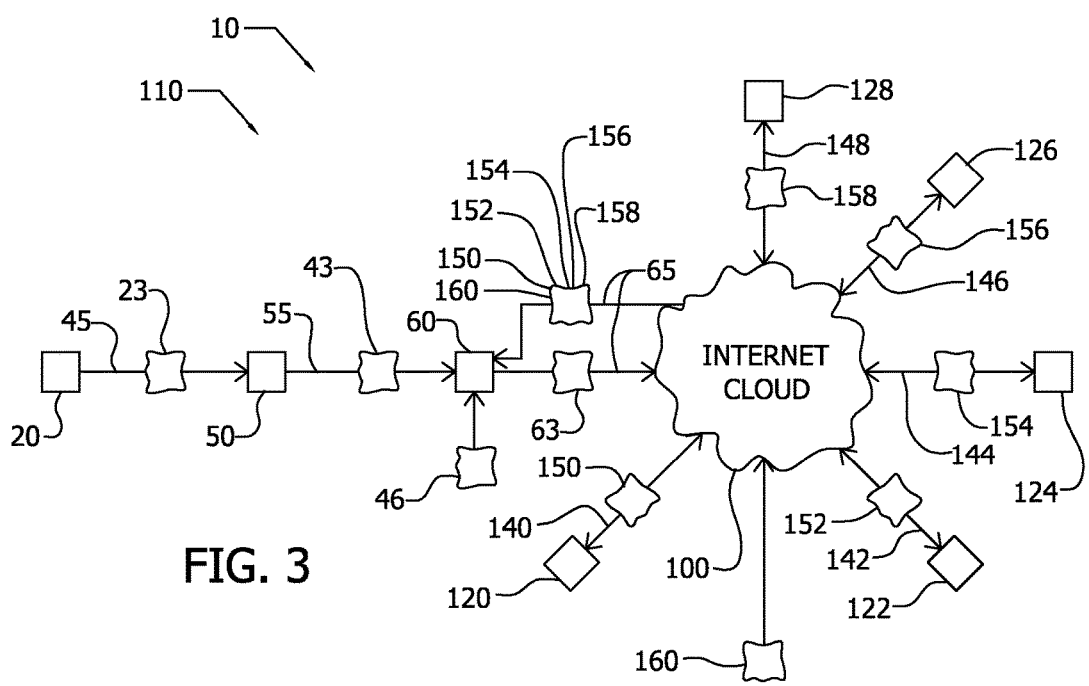
FIG. 3 illustrates by schematic diagram the exemplary monitoring system of FIG. 1A.

App 110, as illustrated in FIG. 3, may allow the user to input data 46 into mobile device 60. Data 46 may include, for example, the number of fish caught, time of catch, specie(s), type of bait, depth at which fish was caught, or size of fish. Data 46 input by the user into mobile device 60 using app 110 may include conditions observed by the user such wind direction, wind speed, wave height, water clarity, or other meteorological conditions or hydrologic conditions. User interface 130 (see FIG. 1B) may allow the user to input data 46 into app 110. Data 63 includes data 43 combined with data 46, in this exemplary implementation.

As illustrated in FIG. 1A, app 110 may include mobile devices 60, 120, 122, 124, 126, 128 that may be in communication with Internet cloud 100 by networks 65, 140, 142, 144, 146, 148, respectively. Network 65, 140, 142, 144, 146, 148 may include a cellular network component of the Internet cloud 100. Mobile devices 60, 120, 122, 124, 126, 128 may communicate with one another through Internet cloud 100 by networks 65, 140, 142, 144, 146, 148 to allow data 63, 150, 152, 154, 156, 158 to be communicated between mobile devices 60, 120, 122, 124, 126, 128. Internet cloud 100 may include cellular networks as well as other networks of local to global scope, and these networks may form at least a portion of networks 65, 140, 142, 144, 146, 148. App 110 may include Internet cloud 100.

Figure 1B:
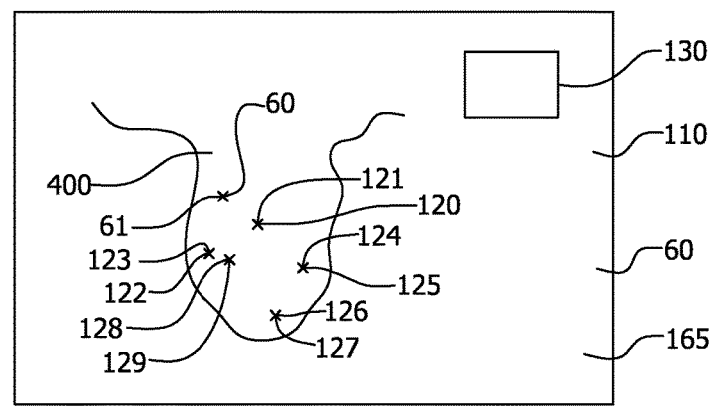
FIG. 1B illustrates by frontal view portions of the exemplary monitoring system of FIG. 1A.

As illustrated in FIG. 1B, mobile devices 60, 120, 122, 124, 126, 128 are situated geographically about water body 400 at GPS locations 61, 121, 123, 125, 127, 129, respectively, as displayed on display 165 of mobile device 60 by app 110. App 110 may include software operatively received by mobile device 60, by Internet cloud 100, or both mobile device 60 and Internet cloud 100.

App 110 may include information set 160 (see FIG. 3) accessed through the Internet cloud 100. Information set 160 may be stored on various storage devices included in Internet cloud 100. Information set 160 may include information indicative of the geography of water body 405 such as boundaries of water body 405, geographic features proximate water body 405—e.g. hills, mountains, valleys, rivers entering water body 405, political boundaries (i.e. borders). Information set 160 may include information related to navigation of water body 405—e.g. depth contours, bottom type, obstructions, shipwrecks, reefs, bars, buoys, navigation channels, correction of magnetic north, lighthouses. Information set 160 may include various meteorological, hydrographic, geologic, or astronomical information such as observed or forecast weather conditions, tide, time of sunrise or sunset, time of moon rise or moonset, or moon phase. Information in information set 160 may be indexed to GPS locations so that app 110 may correlate information set 160 to GPS location, such as GPS locations 61, 121, 123, 125, 127, 129.

App 110, as illustrated in FIGS. 1A and 1B, may include data 150, 152, 154, 156, 158 (see FIG. 3). Data 150, 152, 154, 156, 158 may be similar to data 63. For example, data 150, 152, 154, 156, 158 may include data from a probe, such as data 23 from probe 20, as processed by a transponder, such as transponder 50, at GPS locations 121, 123, 125, 127, 129. Data 150, 152, 154, 156, 158 may include data input into mobile devices 120, 122, 124, 126, 128, respectively, by the corresponding users, such as data 46. The data input into mobile devices 120, 122, 124, 126, 128 by the corresponding users may include, for example, number of fish caught, time of catch, specie(s), type of bait, depth at which fish was caught, size of fish, or observations such as wind direction and speed, wave height, water clarity. Data, such as data 63, 150, 152, 154, 156, 158, may be stored in the Internet cloud 100 and various computers included in Internet cloud 100 may process the data and the data may be integrated in various ways.

FIG. 3 illustrates data flow in exemplary monitoring system 10. As illustrated in FIG. 3, sensor data 23 is communicated from probe 20 to transponder 50, and transponder 50 processes sensor data 23 into data 43. Transponder 50 communicates data 43 to mobile device 60. Under control of app 110, mobile device 60 may allow the user to input data 46, and data 43 may be combined with data 46 to form data 63.

As illustrated in FIG. 3, mobile devices 60, 120, 122, 124, 126, 128 communicate with Internet cloud 100 by networks 65, 140, 142, 144, 146, 148, respectively, to share data 63, 150, 152, 154, 156, 158 with Internet cloud 100 as controlled by app 110. Information set 160 is in communication with Internet cloud 100, as illustrated in FIG. 3.

As illustrated in FIG. 1B, app 110 may integrate data, such as data 63, 150, 152, 154, 156, 158 from mobile devices 60, 120, 122, 124, 126, 128, respectively, and information from information set 160, and then display the data integrated with the information on display 165 of mobile device 60. The data may be displayed on display 165 in various graphs, charts, maps, may be organized in one or more windows, as would be readily recognized by those of ordinary skill in the art upon study of this disclosure.

App 110 may indicate the data, such as data 63, 150, 152, 154, 156, 158, available for display, and app 110 may allow the user to select the data to be displayed or the user to select the manner in which the data is displayed. For example, app 110, as illustrated in FIG. 1B, includes user interface 130 that may include various user selectable controls (e.g. drop down selectable menus, radio buttons, slides, spin boxes, text boxes, toggles) to allow the user to control the behavior of app 110 including the display of data 63, 150, 152, 154, 156, 158 by app 110 on display 165 of mobile device 60 or on display 51 of transponder 50. It should be understood that display 51 of transponder 50 may replicate the display 165 of mobile device 60 and visa versa—the same information may be displayed in the same way on both display 51 of transponder 50 and display 165 of mobile device 60.

For example, the user may select to display data 63, 150, 152, 154, 156, 158 from mobile devices 60, 120, 122, 124, 126, 128 at GPS locations 61, 121, 123, 125, 127, 129. The GPS locations 61, 121, 123, 125, 127, 129 may be displayed on a map, as illustrated, with the map formed by the app 110 from an information set 160 with app 110 integrating the GPS locations 61, 121, 123, 125, 127, 129 with information set 160.

In various implementations, the user may use the user interface 130 to select data to be displayed on display 165, such as data 63, 150, 152, 154, 156, 158 from mobile devices 60, 120, 122, 124, 126, 128. The user may use the user interface 130 to select information from information set 160 to be displayed on display 165. The user may use the user interface 130 to select various combinations of data 63, 150, 152, 154, 156, 158 and information set 160 to be displayed by app 110 on display 165 and the manner in which the various combinations of data 63, 150, 152, 154, 156, 158 and information set 160 are displayed.

The user, in various implementations, may use the user interface 130 to select the portions of data 63 to be communicated to Internet cloud 100 and thence with mobile devices 120, 122, 124, 126, 128. The user may use the user interface 130 to prevent the communication of portions of data 63 to Internet cloud 100 and thence with mobile devices 120, 122, 124, 126, 128. For example, using user interface 130, the user may allow sensor data 43 portion of data set 63 to be communicated to Internet cloud 100 and thence with mobile devices 120, 122, 124, 126, 128, and the user may prevent the communication of some or all of data 46 to Internet cloud 100 and thence with mobile devices 120, 122, 124, 126, 128.

Figure 4A:
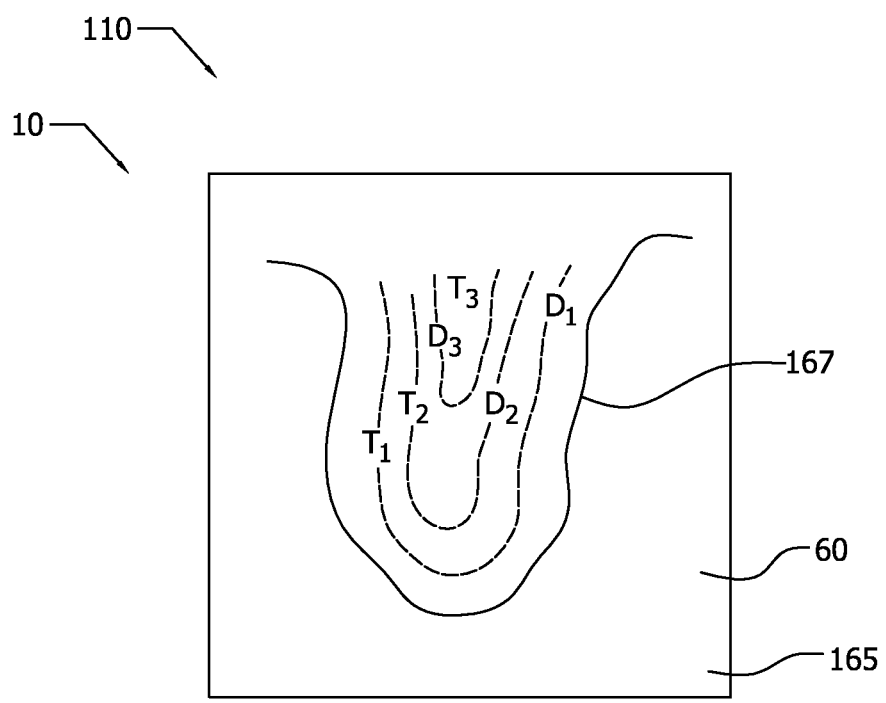
FIG. 4A illustrates by frontal view portions of the exemplary monitoring system of FIG. 1A; and, FIG. 4B illustrates by frontal view portions of the exemplary monitoring system of FIG. 1A.
Figure 4B:
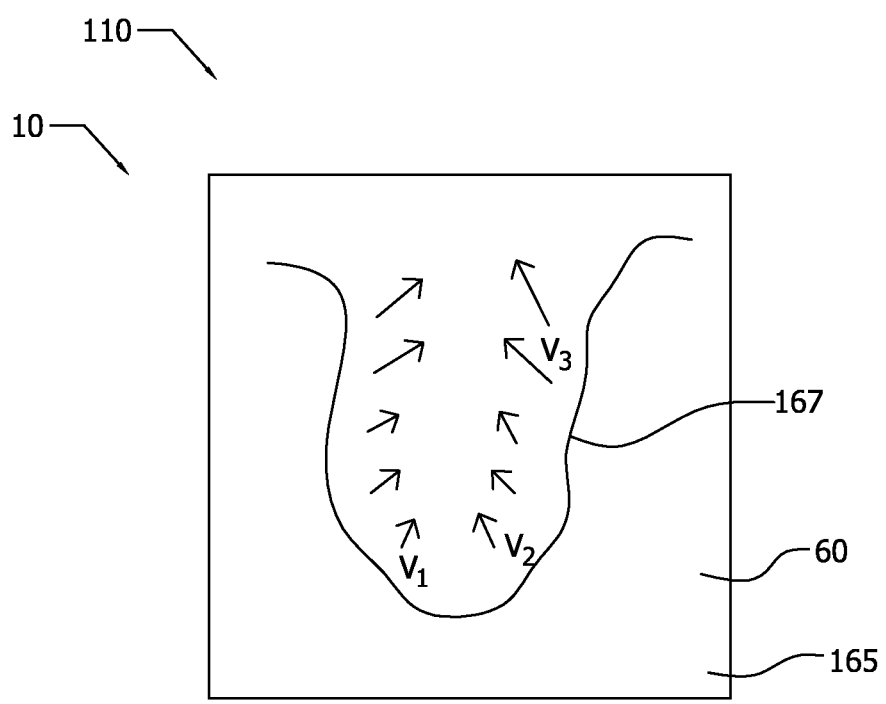

As illustrated in FIGS. 4A and 4B, app 110 may combine data 63, 150, 152, 154, 156, 158 and information set 160 and processed mathematically (e.g. smoothing, interpolation, geostatistical techniques) to generate maps including other representations based upon data 63, 150, 152, 154, 156, 158 for display in real time on display 165 of mobile device 60. Real time, for the purposes of this disclosure, may be within 15 minutes or less of the measurement of the probe data, such as probe data 23, by the probe, such as probe 20.

For example, as illustrated in FIG. 4A, app 110 generates in real time a series of temperature contours $T_1, T_2, T_3 \ldots$ at corresponding depths $D_1, D_2, D_3 \ldots$ superimposed upon map 167 from data 63, 150, 152, 154, 156, 158 and information set 160. $T_1, T_2, T_3 \ldots$ and corresponding depths $D_1, D_2, D_3$ may be indicative of the temperature and depth of the epilimnion, the temperature and depth of the thermocline, the temperature and depth of the hypolimnion, or other such temperature features or combinations of features of water body 400.

As a further example, app 110 generates in real time a series of velocity vectors $V_1, V_2, V_3 \ldots$ superimposed upon map 167 from data 63, 150, 152, 154, 156, 158 and information set 160, as illustrated in FIG. 4B. Velocity vectors $V_1, V_2, V_3 \ldots$ may be indicative of currents in water body 400 caused by, for example, tides, river inflows, or river outflows.

In operation, a monitoring system, such as monitoring system 10, may detect sensor data, such as sensor data 23, using a sensor, such as sensor 22, attached to a probe, such as probe 20. The assembly of probe and sensor may be submersible to traverse various depths between the surface and the bottom of a water body, such as water body 400. The sensor may be in communication with a mobile device, such as mobile device 60, 120, 122, 124, 126, 128 and the mobile device may be in communication with other mobile devices through the Internet cloud.

An app, such as app 110 may be operatively received on the mobile devices, the Internet cloud, or both the mobile devices and Internet cloud. The app, in various implementations, controls the communication of data between the sensor probe assembly and the mobile device, the communication of data between the mobile device and the Internet cloud, and the communication of data between the Internet cloud and other mobile devices.

A number of mobile devices may be in communication with one another via the Internet cloud as directed by the app with the mobile devices located at known GPS locations, such as GPS locations 61, 121, 123, 125, 127, 129. The known GPS locations may be stationary, may move, for example, when the boats to which the sensor probe assemblies are attached move about, or some combination of stationary and moving GPS locations.

The probes may measure water temperatures, water velocities, and corresponding depths at the known GPS locations through which the probes are traversed. The app may allow the mobile devices to share data, such as data 43, among themselves. For example, the data shared between the mobile devices may include the water temperatures, water velocities, and corresponding depths at the known GPS locations among the mobile devices through the Internet cloud.

The app may allow users of the mobile devices to input additional data, such as data 46, that may be shared among the mobile devices through the Internet cloud. The additional data may include data including the catching of a fish, time of catch, specie, type of bait, depth at which fish was caught, size of the fish, conditions observed currently by the user such wind direction, wind speed, wave height, and water clarity.

The app may allow data sharing among the mobile devices in real time, in some implementations. The app may allow storage of the data in the Internet cloud for sharing among the mobile devices so that the data shared among the applications may be cumulative over some period of time that may be specified by the user. In some implementations, the data shared among the mobile devices include data from other mobile devices no longer in communication with the Internet cloud.

The app may process the data in various ways for display of the data upon a display of the mobile device, such as display 165. For example, the app may integrate the data with information sets in communication with the Internet cloud such as, for example map information, and the integration of the data with the information set(s) displayed upon the display. The app may, for example, integrate temperature—depth—GPS location data with user data indicative of fish caught or of observed weather or water conditions to give the user an indication of current conditions of the water body.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A monitoring system, comprising:
    a sensor mounted upon a submersible probe to detect sensor data at a depth within a water body;
    a receiver positioned proximate a water surface of the water body in sonic communication with the submersible probe to receive the sensor data from the submersible probe, the receiver mechanically connected with the submersible probe for traversal of the receiver together with the submersible probe about the water body;
    a mobile device in communication with the receiver to receive the sensor data from the receiver, the mobile device in communication with an Internet cloud to communicate data with the Internet cloud, the data comprising the sensor data and additional sensor data from additional probes geographically disposed about the water body at known GPS locations; and,
    an app operably engaged with the mobile device and with the Internet cloud to control the communication of data between the mobile device and the Internet cloud, the app integrates the data for display on the mobile device in real time.

2. The apparatus of claim 1, the sensor data comprising depth and corresponding temperature at the known GPS locations.

3. The apparatus of claim 1, the sensor data comprising depth and corresponding water velocity at the known GPS locations.

4. The apparatus of claim 1, the data further comprising one or more data elements selected from a group consisting of the catching of a fish, time of catch, specie, type of bait, depth at which fish was caught, size of fish conditions observed by the user such wind direction, wind speed, wave height, water clarity.

5. The apparatus of claim 1, further comprising a map for graphical display of the data integrated with the map.

6. A monitoring system, comprising:
    several submersible probes disposed about a water body with each submersible probe having a sensor mounted thereupon to detect sensor data comprising depths and corresponding temperatures within the water body at known GPS locations, each submersible probe sonically communicates the sensor data from the submersible probe to a corresponding receiver positioned proximate a water surface of the water body, each submersible probe mechanically connected with the corresponding receiver for traversal of each submersible probe together with the corresponding receiver about the water body, each receiver being in communication with an Internet cloud to communicate the sensor data with the Internet cloud; and an app operably engaged with a mobile device and with the Internet cloud to display data on the mobile device received at least in part from the Internet cloud, the data comprising sensor data from the several submersible probes simultaneously in real time.

7. The apparatus of claim 6, the data further comprising temperature and corresponding depth at a top of a thermocline as detected by the several submersible probes.

8. The apparatus of claim 6, the data further comprising temperature and corresponding depth within the water body at known GPS locations over a period of time from the several submersible probes as the several submersible probes are traversed about the water body.

9. The apparatus of claim 8, the period of time being less than one day.

10. The apparatus of claim 8, the period of time being selectable by a user.

11. The apparatus of claim 6, the app accepts for inclusion into the data user input data input by a user.

12. The apparatus of claim 11, the user input data is selected from a group consisting of catching of a fish, time of catch, specie, type of bait, depth at which fish was caught, size of the fish, wind direction, wind speed, wave height, and water clarity.

13. The apparatus of claim 6, further comprising:

a plurality of apps each operably engaged with a corresponding mobile device, each corresponding mobile device in communication with the Internet cloud to display the data simultaneously.

14. A monitoring system, comprising:

a submersible probe comprising a sensor to detect sensor data at a depth within a water body;

a receiver positionable proximate a water surface of the water body that communicates sonically with the submersible probe to receive the sensor data from the submersible probe, the receiver mechanically connected with the submersible probe when deployed for traversal of the receiver together with the submersible probe about the water body;

a mobile device communicable with the receiver to receive the sensor data from the receiver, the mobile device communicates with an Internet cloud to communicate data with the Internet cloud, the data comprising the sensor data and additional sensor data from additional submersible probes geographically disposed about the water body at known GPS locations; and, an app operably engageable with the mobile device and with the Internet cloud to control the communication of data between the mobile device and the Internet cloud, the app integrates the data for display on the mobile device in real time.

15. The apparatus of claim 14, the app accepts user input data input by the user of the app for inclusion into the data.

16. The apparatus of claim 14, the user input data selected from a group consisting of catching of a fish, time of catch, specie, type of bait, depth at which fish was caught, size of the fish, wind direction, wind speed, wave height, and water clarity.

* * * * *